United States Patent [19]

Mundhenke

[11] 4,449,887

[45] May 22, 1984

[54] HORIZONTAL AXIS WINDMILL

[76] Inventor: Ivan W. Mundhenke, 11390 SW. Ironwood Loop, Tigard, Oreg. 97223

[21] Appl. No.: 301,879

[22] Filed: Sep. 14, 1981

[51] Int. Cl.³ .............................................. F03D 7/06
[52] U.S. Cl. ..................................... 415/4; 416/132 B
[58] Field of Search ............................... 415/2 R–4 R; 416/132 B, 240 A

[56] References Cited

U.S. PATENT DOCUMENTS

| | | | |
|---|---|---|---|
| 658,129 | 9/1900 | Steude | 415/2 R |
| 698,409 | 4/1902 | Neuser | 415/4 R X |
| 717,939 | 1/1903 | Hernandez | 415/3 R |
| 744,065 | 11/1903 | Gran | 415/3 R |
| 753,541 | 3/1904 | Butler | 415/3 R |
| 1,333,987 | 3/1920 | McManigal | 415/4 R X |
| 1,502,950 | 7/1924 | Greenbrook | 415/4 R |
| 1,534,799 | 4/1925 | Maine | 415/2 R |
| 1,790,175 | 1/1931 | Spencer | 415/2 R |
| 2,252,523 | 8/1941 | Plotkin | 416/132 B X |
| 3,902,072 | 8/1975 | Quinn | 416/111 X |
| 3,988,072 | 10/1976 | Sellman | 415/2 R |
| 4,017,204 | 4/1977 | Sellman | 415/2 R |
| 4,036,916 | 7/1977 | Agsten | 416/240 A X |
| 4,115,028 | 9/1978 | Hintze | 415/2 R |
| 4,118,637 | 10/1978 | Tackett | 416/197 A X |
| 4,127,356 | 11/1978 | Murphy | 415/2 R |
| 4,134,708 | 1/1979 | Brauser et al. | 416/132 B |
| 4,151,424 | 4/1979 | Bailey | 416/132 B X |
| 4,218,183 | 8/1980 | Dall-Winther | 416/132 B X |
| 4,342,539 | 8/1982 | Potter | 416/132 B X |
| 4,357,130 | 11/1982 | Forrest | 416/196 A X |

FOREIGN PATENT DOCUMENTS

| | | | |
|---|---|---|---|
| 497835 | 12/1950 | Belgium | 416/DIG. 6 |
| 2539058 | 3/1977 | Fed. Rep. of Germany | 415/2 R |
| 2732192 | 1/1979 | Fed. Rep. of Germany | 415/4 R |
| 501843 | 4/1920 | France | 415/4 |
| 2291379 | 6/1976 | France | 416/119 |
| 478646 | 2/1953 | Italy | 416/DIG. 6 |
| 8478 | 11/1899 | Norway | 416/132 B |
| 396368 | 1/1933 | United Kingdom | 416/DIG. 6 |

Primary Examiner—Everette A. Powell, Jr.
Attorney, Agent, or Firm—Eugene M. Eckelman

[57] ABSTRACT

A base frame supports a horizontal shaft having one or more wind driven members secured thereon. Each of the wind driven members includes a shaft of light-weight framing and plurality of elongated longitudinally extending light-weight vanes having wind engaging surfaces. The vanes have a wind driving position on one side of the shaft and a return position on the other, and light-weight wind deflectors disposed at the front of the frame protecting the return position of the vanes from the wind. The wind deflectors are angularly adjustable whereby the deflected wind flowing off the longitudinal edges thereof is selectively directed against the vane surfaces in their driving position. The shaft has an output for operating a selected driven apparatus such as a generator. The base frame is rotatably supported on a pivot for selected adjustment relative to the wind.

1 Claim, 8 Drawing Figures

HORIZONTAL AXIS WINDMILL

BACKGROUND OF THE INVENTION

This invention relates to new and useful improvements in windmills and is particularly concerned with a windmill which operates on a horizontal axis.

Various types of windmills have been used for the purpose of obtaining power from the natural flow of air. Apparatuses now being tested and/or used are primarily directed to the stand-up type windmill having a plurality of blades or vanes which are feathered for the purpose of providing a glancing surface to produce the driving force. Such windmills are extremely costly and require considerable technical expertise to construct them. In addition, the glancing force of the wind on the feathered blades is extremely inefficient since the effective sail surface is very small.

Devices have also been proposed which use horizontal axes but the over-all construction thereof is not of an efficiency that make them effective for practical use. Such lack of efficiency is considered to be due to the complexity of structure and their heavy weight.

SUMMARY OF THE INVENTION

According to the present invention and forming a primary objective thereof, a windmill apparatus is provided having the combined features of being inexpensive to manufacture and extremely efficient in presenting a driving force to the wind.

In carrying out these objectives, the present invention employs a horizontal base frame supporting a horizontal shaft and one or more wind driven members on the shaft each having a plurality of elongated longitudinally extending vanes projecting radially from the shaft and having wind engaging surfaces. The shaft and vanes have an improved structure making them strong and rugged in operation but at the same time making them of ultra light weight. The invention has vertically tilted wind deflector means at the front which provide a wind driving position on one side of the shaft. The wind deflector means is adjustable in its tilted position for positioning it in the most effective angle depending upon wind conditions or requirements for the output of the windmill. The shaft has output means for driving a generator or the like, and if desired two or more of the wind driven members may be mounted on a frame and operate on a common shaft. The frame has rotatable support on tracks with hold-down wheels associated therewith, and the frame also has a pivot between its ends whereby it is capable of being moved or driven to selected positions relative to the wind. The device may employ reversible power drive means and means influenced by the wind arranged to energize the reversible power means selectively to maintain the wind driven members properly facing the wind.

The invention will be better understood and additional objects and advantages will become apparent from the following description taken in connection with the accompanying drawings.

DETAILED DESCRIPTION OF A PREFERRED EMBODIMENT

Figures 1, 2, 3:
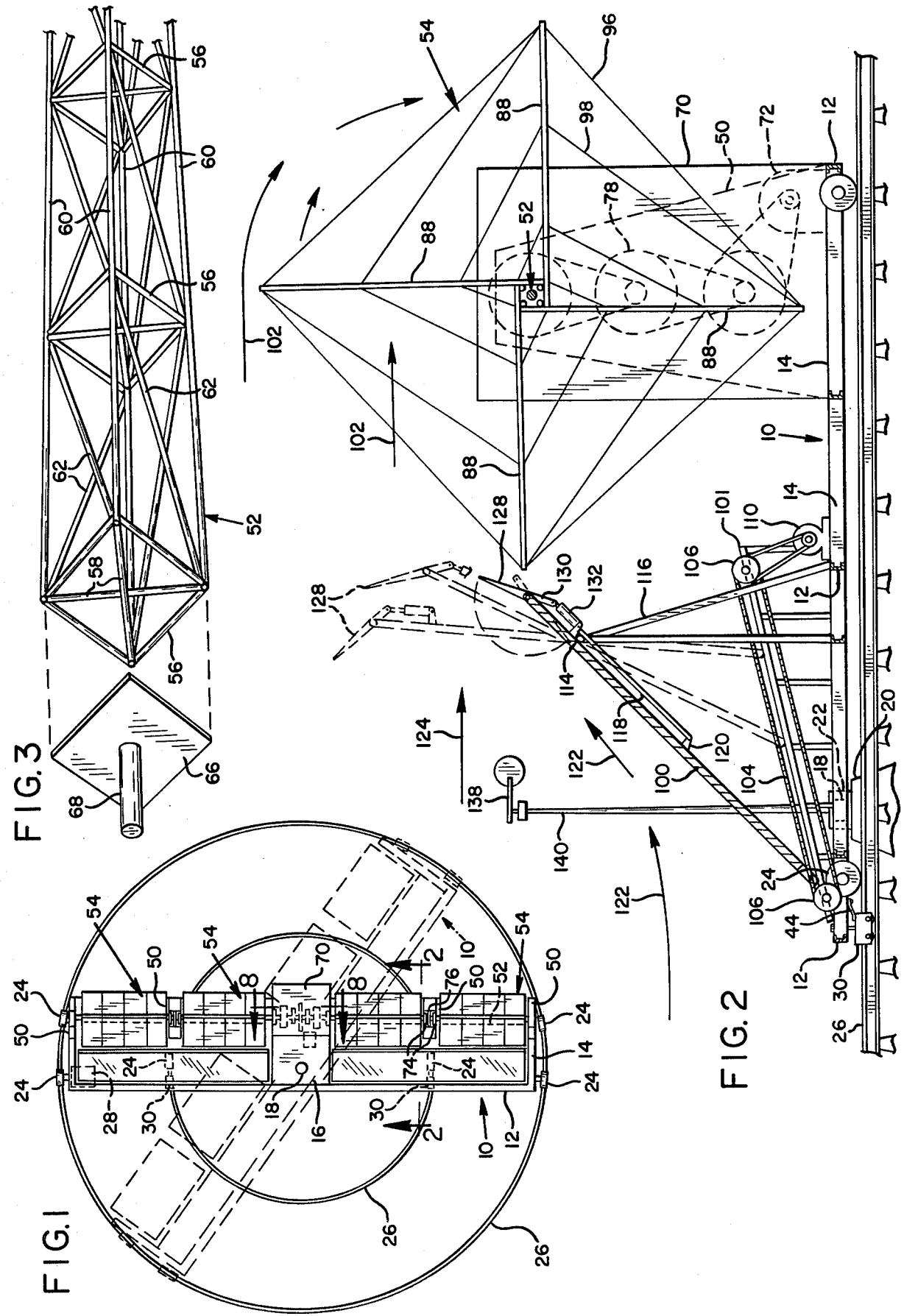
FIG. 1 is a plan view of the present horizontal axis windmill and showing positions thereof in broken lines.
FIG. 2 is an enlarged sectional view of the windmill taken on the line 2—2 of FIG. 1.
FIG. 3 is an enlarged fragmentary perspective view of a shaft portion of the windmill.

With particular reference to the drawings, the invention employs an elongated base frame 10 having longitudinal frame members 12 and connecting front to rear frame members 14. A central front to rear frame portion 16 is provided and has a journaled association with an upright pivot post 18 secured to an anchor assembly 20 in the ground or secured to a suitable supporting surface for the frame such as on a building or upright frame. By means of the pivot 18, the base frame 10 can be adjusted rotatably as indicated by one such position in broken lines in FIG. 1. Pivot post 18 may include a brake 22 capable of holding frame 10 in a set position if desired.

Figure 6:
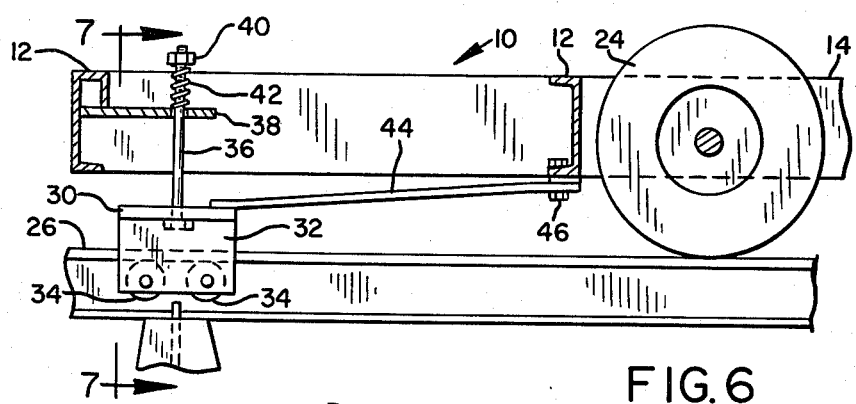
FIG. 6 is an enlarged fragmentary sectional view, partly in section, showing wheel and track supporting structure for the windmill.
Figure 7:
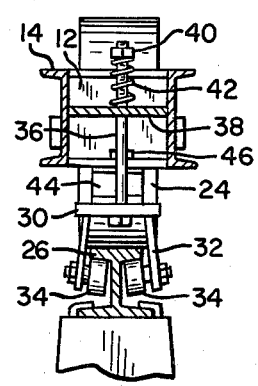
FIG. 7 is a section view taken on the line 7—7 of FIG. 6.

The frame 10 is supported by wheels 24 operating on inner and outer flanged tracks 26, also seen in FIGS. 6 and 7. Such inner and outer tracks are used to provide end and intermediate support for the frame 10, and such arrangement allows the said frame to be of light construction. More than one intermediate track may be used if desired. One of the wheels such as an outer wheel as shown in FIG. 1 is provided with a reversible drive motor 28 which may for example comprise a reversible electric motor with brakes.

It is also desirable that hold-down means be provided between the frame 10 and at least one of the tracks 26 to prevent de-railing in the event of a high wind. Such hold-down means is shown herein as associated with the inner track and preferably is provided at both of the wheel support points between the frame and inner track. The hold-down means comprises a carriage 30 having depending walls 32 supporting wheels 34 hooked under each side of the flange of track 26. Carriage 30 has an upright rod 36 leading slidably through a flange extension 38 on frame member 12. This rod carries an abutment 40 on its upper end, such as a threaded nut, and supports a compression spring 42 between such abutment and the flange 38. A cushioned hold-down is thus provided for frame 10 and serves to prevent the windmill structure from tipping in the event of high winds.

Carriages 30 have plate-like arms 44 secured between the carriages and frame members 12. Arms 44 are welded to the carriages 30 and are pivotally secured to frame members 12 by bolts 46. The bolt connections permit arms 44 to turn in the event track 26 is not truly round. Arms 44 hold carriages 30 in longitudinal placement and flex up and down as required.

The frame 10 has upright standards 50 providing journaled support for a horizontal shaft 52 integral with wind driven members 54 to be described. Although a single one of the wind driven members 54 may be used, they preferably are mounted in tandem, such as two on each side of the center, as shown in FIG. 1. The structure of shafts 52 for the wind driven members is shown in detail in FIG. 3. Such shafts are made of light weight frame pieces, for example aluminum, to reduce the over-all weight of the windmill. The shafts are made up of spaced rectangular frames 56 having diagonal reinforcing pieces 58 in these frames. The corners of the rectangular frames 56 are connected to each other by longitudinal frame pieces 60 parallel with the shaft. In addition, longitudinal frame pieces 62 extend from each corner of frames 56 to the next corner of the adjacent frame in an angular and somewhat spiral pattern. The angular or spiral direction of the frame pieces 62 is in the direction of driving force of the wind driven members 54, whereby the light weight shaft is capable of transmitting torque applied to it by the wind driven members.

Figures 4, 8:
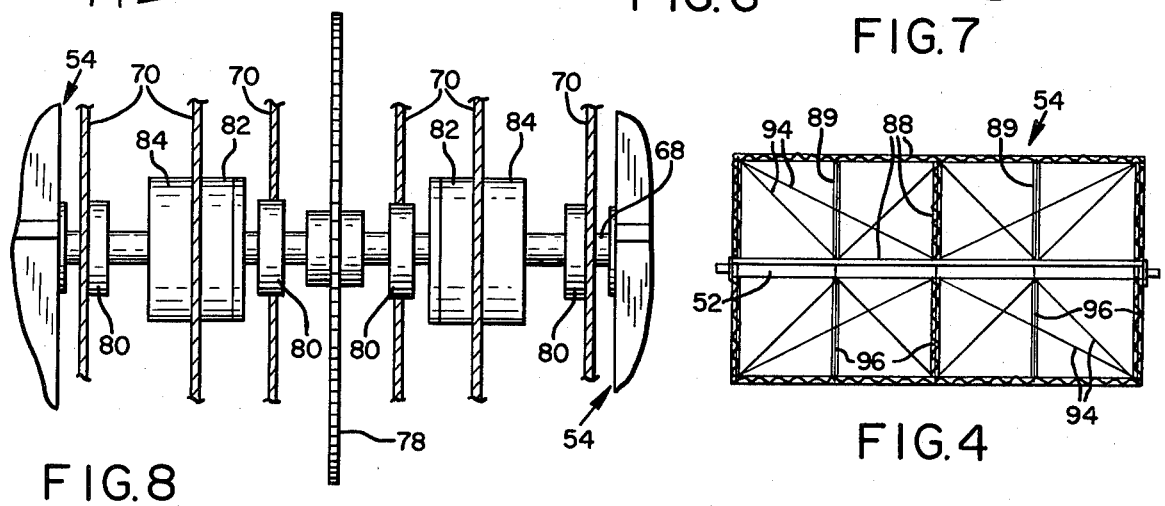
FIG. 4 is an enlarged elevational view of a vane section of the windmill.
FIG. 8 is an enlarged fragmentary sectional view taken on the line 8—8 of FIG. 1.

Each wind driven member 54 has a shaft portion 52, and these shaft portions have integral end plates 66 with stub shafts 68 supported in the upright standards 50 and in a central housing 70 on the frame 16 enclosing a generator 72. Shaft portions 52 between adjacent wind driven members 54 are supported by bearings 74, FIG. 1, and are connected by universal joints 76 to eliminate the necessity of precise alignment of the respective shaft segments. The shafts 52 leading into central housing 70 are associated with a step-up sprocket assembly 78, FIGS. 2 and 8, in the housing which drives the generator 72. With particular reference to FIG. 8, the end stub shafts 68 of shafts 52 at the housing 70 have bearing support 80, preferably by thrust bearings, in wall portions of said housing and these two shaft portions have clutches 82 and brakes 84 therein to control their connection to the generator. Operation of the two sides of the assembly may be controlled, namely, both of the assemblies on opposite sides of the housing 70 can be placed in operation by release of the brakes 84 and engagement of the clutches 82 or if it is desired that one side be shut down, its clutch can be disengaged and its brake set.

Figure 5:
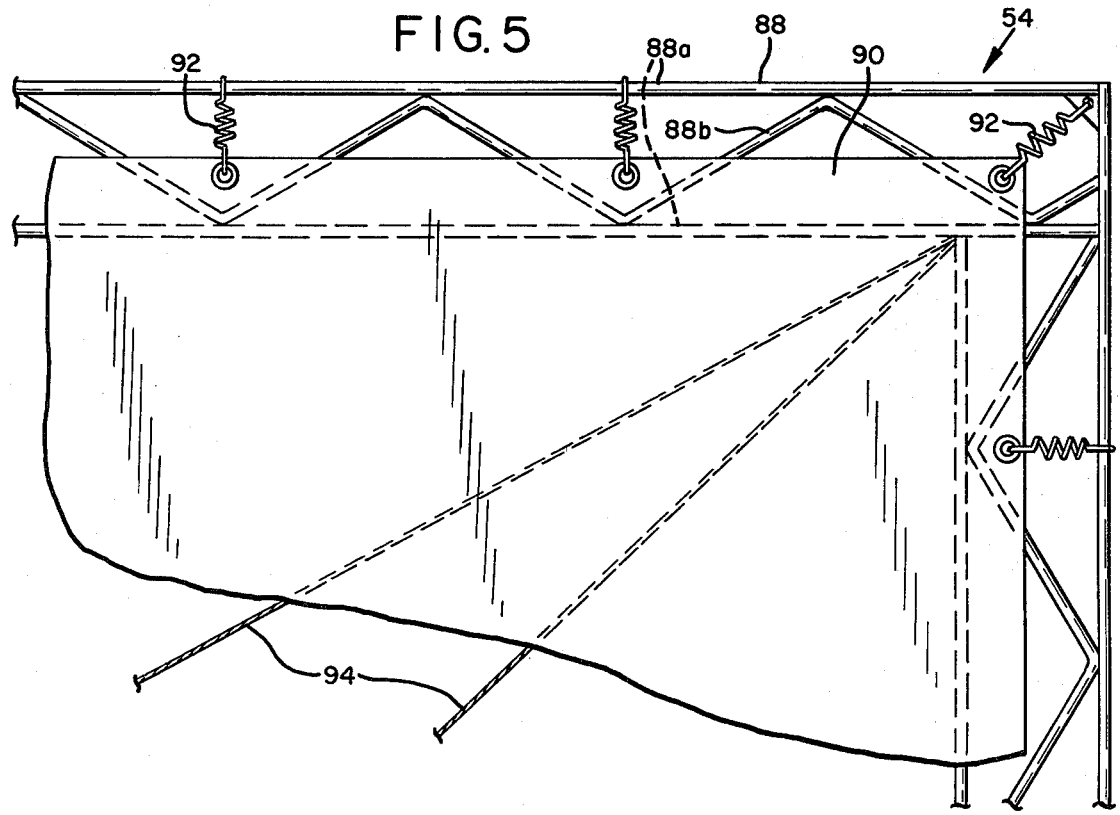
FIG. 5 is an enlarged fragmentary portion of such a vane section.

Each of the wind driven members 54 comprises rectangular sections, FIGS. 1, 4 and 5, extending radially and integrally from the shaft 52 and having a truss-like defining frame 88 made up of pairs of parallel bars 88a and zig-zag intermediate bars 88b. As best noted in FIG. 4, frame 88 extends around the periphery of the member 54, including the ends, and also through the center. Frames 88 also include intermediate reinforcing members 89 such as tubular members. Four of such frames 88 are shown in equally spaced position on the shaft but it is to be understood that any number of such frames may be used to obtain maximum driving efficiency from the wind.

Frames 88 support flexible vanes or sails 90 which comprise the wind driving surface. These vanes are secured to the frames by a plurality of spring connectors 92. Frames 88 have shaft reinforcing lines 94 secured angularly therein for bracing the frame in a longitudinal direction. These lines extend from corner portions of the frame to various central portions of the shaft 52 and thus provide longitudinal rigidity for the shaft. Thus, the lines 94 provide longitudinal strength to the light weight shaft and the spiral frame pieces 62, FIG. 3, provide torque strength to the shaft, the over-all purpose being to provide a large wind surface with minimum weight. A plurality of connecting lines are associated with the wind driven members 54 for providing rigidity thereto and for transferring the wind power of this light structured mechanism to the shaft. A first of such connecting lines 96 is secured around the wind driven members 54 at the tips of frames 88 for maintaining the frames in equally spaced relation. Second of such connecting lines 98 extend from each tip of the frames 88 to an inner point on the next following frame and from there these lines extend to the yet next following frame at still a further inner point. From this latter point, the lines are connected to the frame 88 in the area of the shaft 52. This spiral-like arrangement of lines provides an efficient transfer of the wind power to the shaft and yet allows the wind driven members to be of extreme light weight. Assemblies of the lines 96 and 98 are spaced suitably along the wind driven members such as at the ends, at the center, and at reinforcing members 89.

The present windmill front baffle plates 100 which serve the dual purpose of protecting the return portion of the vane assemblies from the wind and also of deflecting the wind in this area up into the driving portion, namely, the area designated by the arrows 102 in FIG. 2. For this purpose, the baffle plates 100 extend upwardly from the frame 10 to a point at about the plane of the shaft 52 and are tilted toward the driving portion. In a preferred construction, these baffles are adjustable angularly and also in height, and for this purpose the bottom end thereof is slidably supported on an inclined ramp 101 and are connected to a link of a chain-type drive 104 operating over end sprocket wheels 106 having journaled support on the ramp 101. One of the sprocket wheels has a drive connection with a reduction gear motor 110 on the frame 10. Motor 110 is of the self braking reversible type for holding the chain-type drive in positions of adjustment.

The upper end of baffle plates 100 rests on a transverse bar 114 integral with an upright frame 116 spaced a short distance in front of the wind driven members 54. Baffle plates 100 are slidable on the bars 114 and are held down on these bars in slidable arrangement by rods 118 mounted on the rear suface of the plates 100 in spaced relation by brackets 120 and slidably enclosing the rods 114. Baffle plates 100, being supported at both top and bottom ends, can be of light weight structure and slidably powered by a small motor.

Angular adjustment of the baffle plates 100 is accomplished by operation of chain drive 104, and as apparent by the full and broken line positions thereof in FIG. 2, not only does the angular relation of the plates vary according to the vertical but the baffle plates are held close to the wind driven members when only a slight adjustment is made. This serves to provide a precisely controllable and efficient deflection of wind into the wind driven members. The system is arranged such that the driving force is at maximum, as indicated by arrows 122, in a lowered position of the plates 100, namely, the full line position in FIG. 2, and the driving force is shut off in the extreme raised position. The deflected wind currents in lowered positions of the baffle plates assist the main wind currents, designed by the arrow 124, that flow straight or horizontally into the vanes. All of the wind flow is shut off in the maximum raised position of the plates 100. Thus, control is available from the maximum driving force to a shut-off position and all positions in between.

The tops of the baffle plates 100 are provided with fine adjustment means of wind deflection, comprising a blade 128 pivotally attached to the top of the baffle plates and having a lever arm 130 connected to an operating plunger mechanism 132 on the plate 100 capable of adjusting the blade angularly relative to plate 100. Two of such positions are shown in FIG. 2. The extent of wind movement over the top of plates 100 can even be more accurately controlled than angular adjustment of plates 100 by adjustable positioning of blade 128.

According to the invention, a large vane area is exposed to the wind with a minimum cost of construction, minimum weight and a minimum technical requirement for construction. The baffle plates 100 in addition to protecting the return area of the vanes 54 also uses moving air in this area as an additional drive force to thus produce an efficient windmill assembly. The horizontal disposition of the frame and vane assemblies makes the device easy to install on the ground or on a building or the like. If installed on the ground, wind driven members 54 can readily project the required distance into the air for picking up wind currents. The large surface of the vanes 90 provides a strong driving force particularly since there is no appreciable friction of the air moving forwardly into the vanes and through the vanes. Also, there is no back pressure from spent wind rearwardly of the vanes by any rear baffles, and furthermore, there is no resistance from any funneling of the wind as it enters or leaves the vanes. The present windmill will withstand stronger winds than the conventional windmill because the vanes are supported at both ends.

Speed control of the vane assemblies can be provided either by the angle of tilt of the baffle plates 100 and positioning of blades 128 or if desired the frame 10 can be turned by means of motor 28 to vary the angle of impingement of the wind against the vane assemblies. With reference to FIG. 2, a wind vane type control 138 can be supported on an upright post 140 on the frame 10 and by suitable control with the motor 28 it can direct the frame in the desired position for efficient engagement by the wind on the vanes. That is, as the wind shifts, the weather vane 138 by suitable control of the motor can shift the frame to face the wind in a selected position and maintain it in such position. Pivotal support of the base frame 10 may not be necessary in areas where the wind direction is constant. Post 140 may also be mounted on a stationary post, such as on the pivot post 18, so as not to turn with frame 10.

It is to be understood that the form of my invention herein shown and described is to be taken as a preferred example of the same and that various changes in the shape, size and arrangement of parts may be resorted to without departing from the spirit of my invention, or the scope of the subjoined claims. For example, the shaft or shafts 52 may be associated with any type of driven member and not necessarily a generator.

Having thus described my invention, I claim:

1. A windmill comprising a base frame having opposite ends and front and rear portions, horizontal shaft means supported on said frame, a wind driven member secured on said shaft means, said wind driven member including a plurality of elongated longitudinally extending vanes projecting radially from said shaft means and having wind engaging surfaces, said vanes comprising lightweight framing and being braced one with the other by tie lines, said vanes having a wind driving position on one side of said shaft means and having a return position on the other side of said shaft means, a wind deflecting member disposed at the front of said base frame protecting the return position of said vanes from the wind and having an upwardly disposed face surface terminating in top and bottom longitudinal edges, with said top edge positioned such that deflected wind is arranged to engage said wind driven member for driving the latter, a transverse support on said base frame guiding said wind deflecting member adjacent the top edge of the latter in a pivoting slidable connection, drive means on said base frame supporting said wind deflecting member at the bottom thereof and arranged to move the bottom of said wind deflecting member toward or away from said wind driven member, said drive means being inclined upwardly in a direction toward said wind driven member, said drive means, upon moving the bottom edge of said wind deflecting member toward said wind driven member, causing the top edge of said wind deflecting member to pivot rearwardly on said transverse support and to move upwardly and away from said wind driven member, thus controlling the deflection of the wind and the exposure of said wind driven member to the wind by actuation of said drive means, and a pivotal blade extension on the upper end of said wind deflector means.

* * * * *